Oct. 9, 1956     T. W. WINSTEAD     2,765,493
APPARATUS FOR FORMING AND EMBOSSING THERMOPLASTIC MATERIALS
Filed March 14, 1951     6 Sheets-Sheet 5
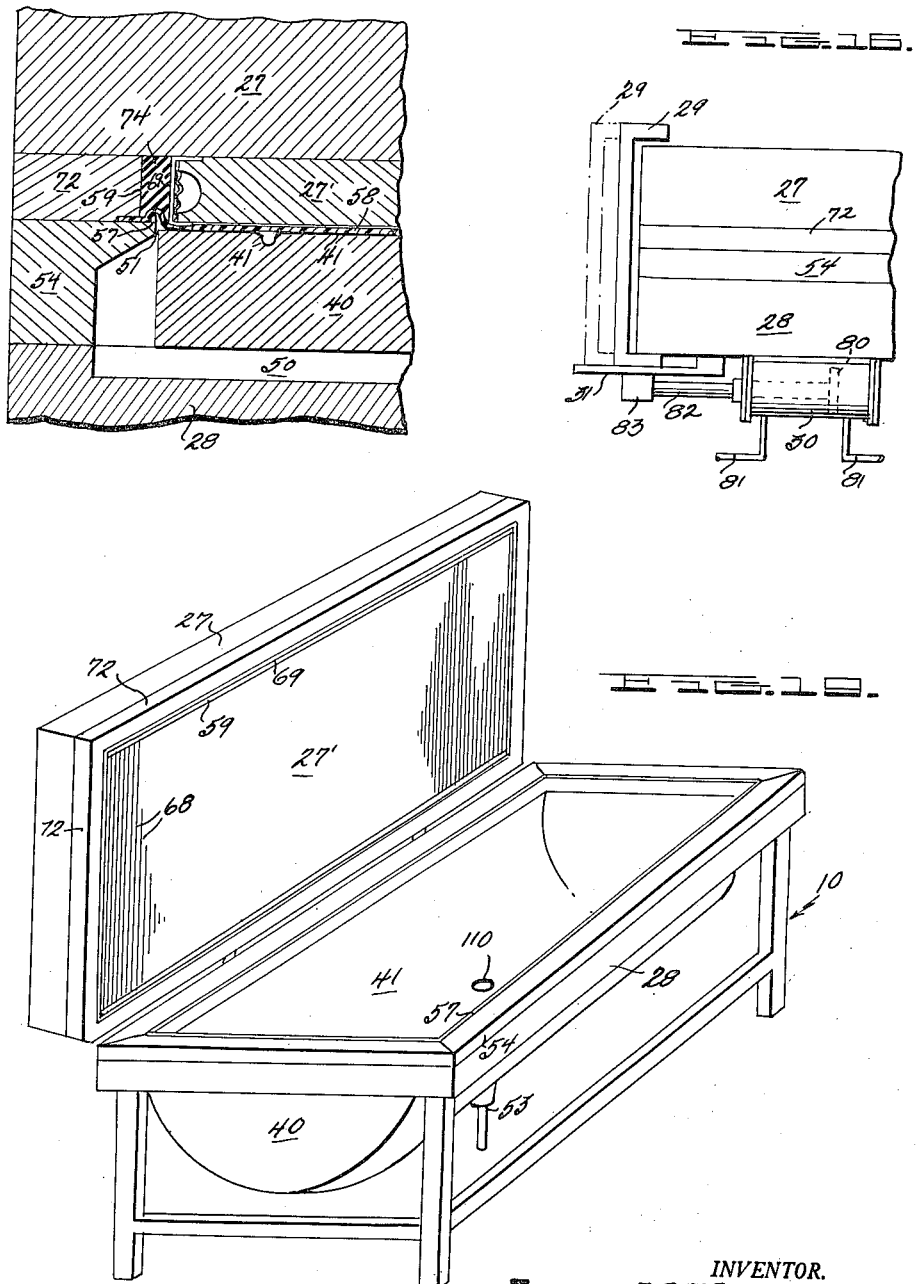
INVENTOR.
THOMAS W. WINSTEAD
BY
Semmes, Keegin, Robinson & Semmes
ATTORNEYS Oct. 9, 1956 T. W. WINSTEAD 2,765,493
APPARATUS FOR FORMING AND EMBOSSING THERMOPLASTIC MATERIALS
Filed March 14, 1951 6 Sheets-Sheet 6

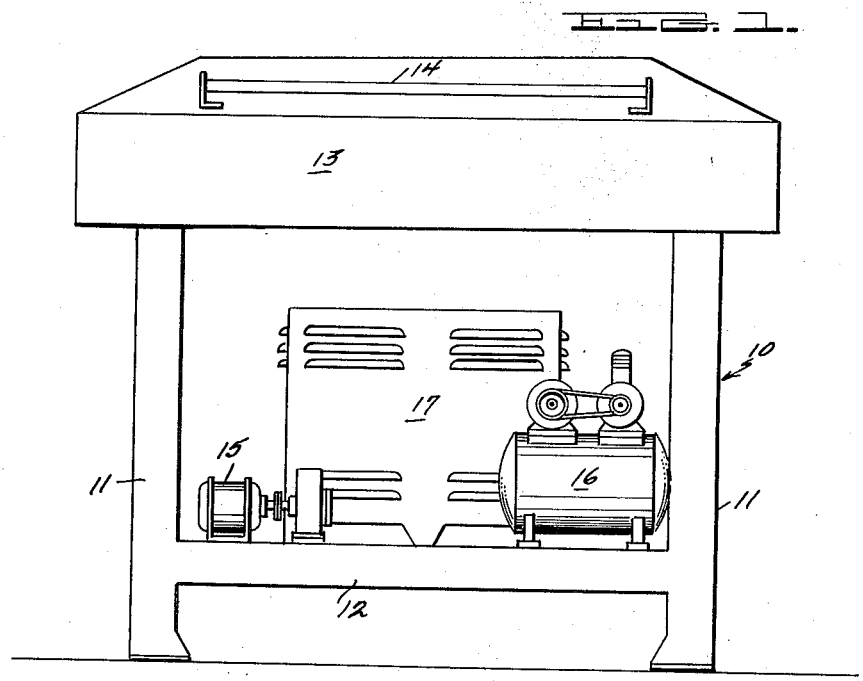
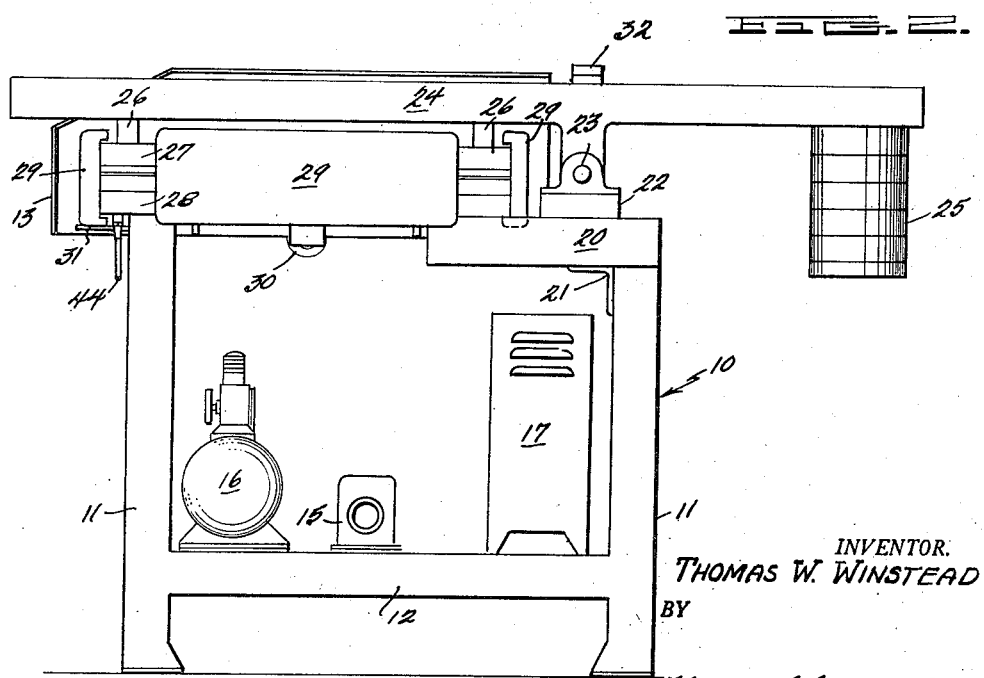

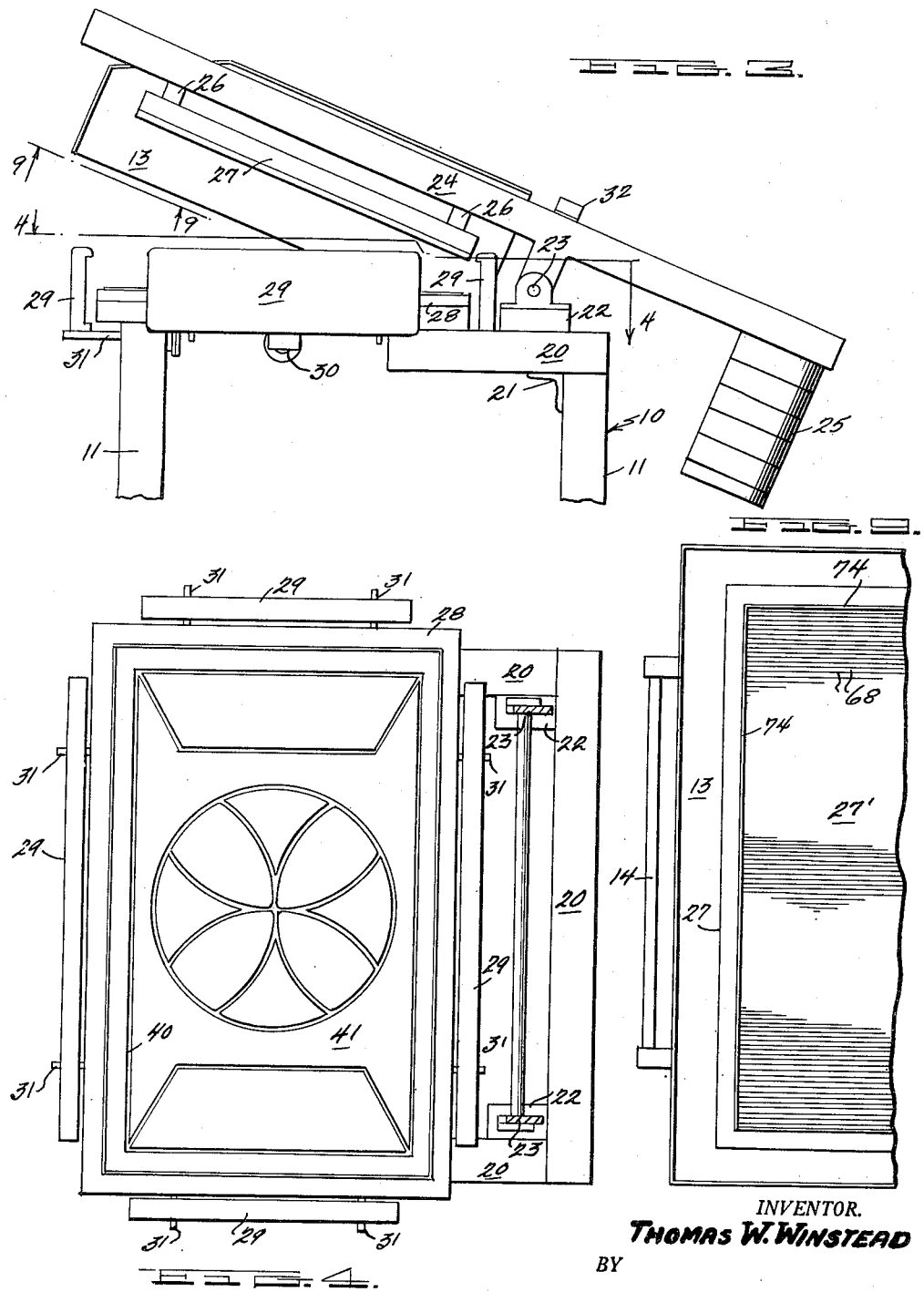

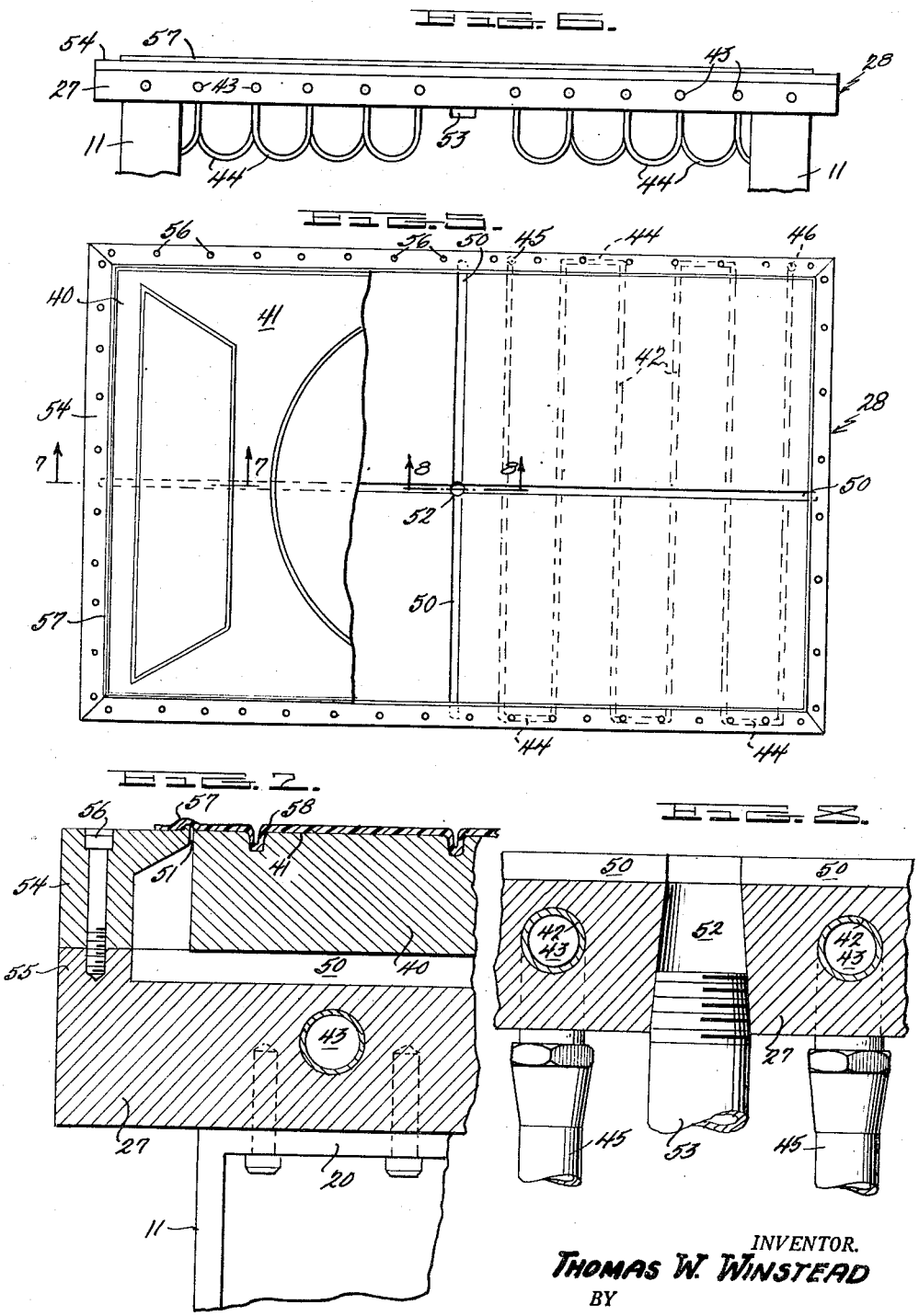

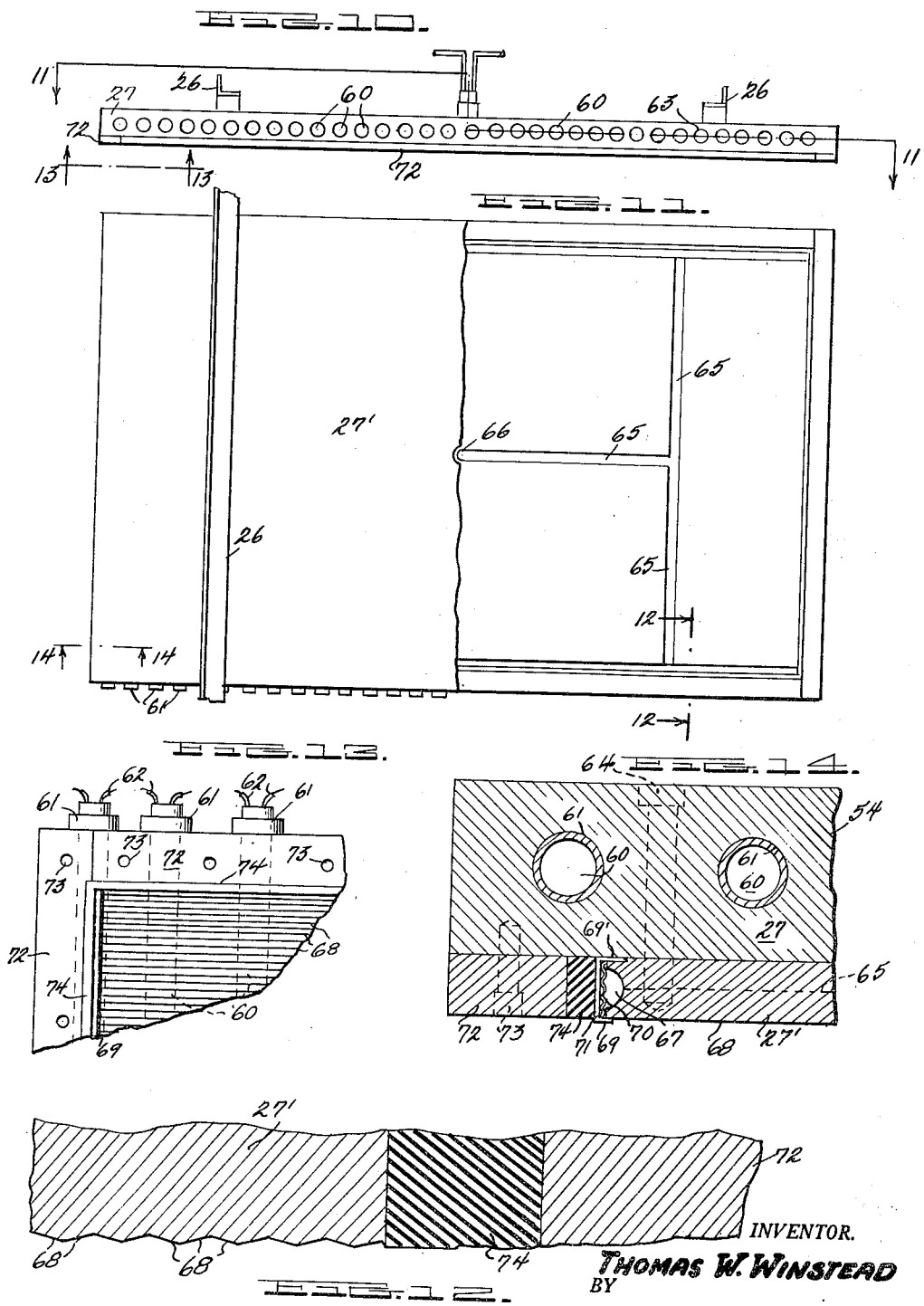

INVENTOR
*THOMAS W. WINSTEAD*

BY
*Semmes, Keegin, Robinson & Semmes*
ATTORNEYS

2,765,493

APPARATUS FOR FORMING AND EMBOSSING THERMOPLASTIC MATERIALS

Thomas W. Winstead, Baltimore, Md., assignor to Hedwin Corporation, Baltimore, Md., a corporation of Maryland Application March 14, 1951, Serial No. 215,552

4 Claims. (Cl. 18—19)

This invention relates to means for forming and embossing thermoplastic materials and has specific reference to an apparatus for working thermoplastic film or sheeting to produce deep hollow forms and/or to reproduce designs in fine detail and of great depth on the surface of said materials. The present application is a continuation-in-part of my copending application Serial No. 185,044, filed September 15, 1950, now Patent 2,702,411, granted February 22, 1955, and provides all the mechanical and electrical means of carrying out the method described in that application.

In the embossing of flexible thermoplastic film or sheeting, as distinguished from the forming thereof, standard practices call for the use of either a rotary machine if the embossing is relatively light or a press type machine if the embossing is to be deeper. Neither of these methods, however, can achieve really deep embossing of a three-dimensional character wherein the bottom of a depression in the material may be as much as a quarter of an inch or more from an adjacent ridge on the top surface of the material.

As described in applicant's co-pending application, applicant has developed an improved method for embossing and forming plastic film or sheeting. This method comprises placing the material between a heating source and a forming or embossing surface, drawing the material into direct contact with said source by vacuumizing the space between the source and the material, creating a vacuum between the material and said surface, releasing the vacuum between the material and the heating source and forcing the material onto said surface so that the material will take the shape or impressions thereof. It is contemplated that vacuums created on both sides of the thermoplastic sheet be utilized to eliminate all the air from between the material and the heating source and from between the material and the embossing surface so that no bubbles or streaks will appear in the finished product.

In carrying out the method of applicant's invention, which is particularly adapted to the embossing of flexible thermoplastic material in the form of films or sheeting, three basic steps are involved: (1) a heating step, (2) a transferring step, and (3) a forming and cooling step.

The heating step is a most important phase of this process. This step is accomplished by sucking or blowing a sheet or film of flexible thermoplastic material to be worked against a heating source which is located directly adjacent a mold. The material is then held against this heating source by a differential in pressure for however long it is necessary to heat it. The transfer of heat from the heating source to the material is extremely rapid as it is direct conductive heating, an extremely fast means of heating. The temperature of the heating source depends upon the type of film or sheeting being used, but normally should range between 250° F. and 400° F. In the use of the very thin films, such as .001 inch to .002 inch the heating time is almost instantaneous. In the use of thermoplastic sheeting in the range of .02 to .04 inch somewhere between 5 to 10 seconds is required for properly heating the material.

One of the main problems in heating by this method is the elimination of air between the thermoplastic material and the heating source. The elimination of air is absolutely essential in the deep embossing of flexible thermoplastic materials in order to ensure intimate contact between the heating source and the material at all points. Besides making for more uniform and faster heating, the elimination of air avoids all bubbles and streaks in the finished product due to unheated areas of the material failing to take the impressions of the embossing surface of the mold. In forming operations, the elimination of all air is essential to ensure uniform thickness in the material of the finished product.

The elimination of air has been accomplished by various methods, depending upon the particular application and the amount of heat required. In some cases, a metal screen or perforated sheeting has been used on the surface of the heating source to allow the air to vent through to a bleeding point and the material is drawn into direct contact with the screen which in turn is placed firmly against the heating source. The screen method is not practical because the material sticks to the screen as well as taking the impressions thereof.

Another method is to scribe a plate forming the heating source with various small lines leading to a central bleeding point, which allows the air to escape and the film to come into contact with the plate. This method is not too good because the plate surface should be smooth in order to prevent impressions being made on the thermoplastic material being heated. Yet another method is to have a convex or concave surface formed on the plate to allow the air to be swept from the center out or from the outer edge in to a central bleeding point. However, the best method for the elimination of air between the thermoplastic material and the heating surface is to have the surface of the plate rippled or grooved very gently along its length to form a surface similar to that of a wash board with the ripples leading to a central bleeding point which allows the air to escape.

A primary object of the part of applicant's invention defined in the present application is to provide a means to accomplish the above-described method for forming and embossing thermoplastic film and sheeting, both rigid and non-rigid, which is simple, fast, versatile and economical.

Another object of this invention is to provide a means for the purpose described including a vacuum source, air passages and valves whereby flexible thermoplastic material is drawn into direct contact with a heating plate after all the air has been eliminated from the space between the material and the heating plate.

Another object of this invention is to provide a means for the purpose described including vacuum sources, atmospheric or other pressure sources, valves and timing means whereby vacuums are drawn in sequence on alternate sides of a piece of flexible thermoplastic material to be embossed or formed in order to accomplish the following steps: Eliminate virtually all air between the material and a heating source, draw the material into direct contact with the heating source, eliminate virtually all air from between the material and an embossing or forming surface, and instantaneously forcing the material onto said surface.

With these and other objects and advantages in view, which will become more apparent during the course of the following description, the invention consists in the features and combinations hereinafter set forth.

In order to make the invention more fully understood, preferred embodiments thereof have been made the subject of illustration in the accompanying drawings in which:

Figure 1 is a front elevation of the apparatus of the invention;

Figure 2 is a side elevation of the apparatus of Figure 1;

Figure 3 is a fragmentary side elevation of the apparatus of Figure 1 with opposed plates in open position;

Figure 4 is a sectional plan view taken on line 4—4 of Figure 3;

Figure 5 is a fragmentary plan view of the lower plate;

Figure 6 is a front elevation of the lower plate showing the cooling tubes;

Figure 7 is an enlarged detail of the lower plate taken on line 7—7 of Figure 5;

Figure 8 is an enlarged detail on line 8—8 of Figure 5;

Figure 9 is a fragmentary plan view of the heating surface of the upper plate taken on line 9—9 of Figure 3;

Figure 10 is a front elevation of the heating plate shown in Figure 9;

Figure 11 is a fragmentary plan view of the heating plate taken along the line 11—11 of Figure 10;

Figure 12 is an enlarged fragmentary detail of the heating plate taken on line 12—12 of Figure 11;

Figure 13 is an enlarged fragmentary view taken on line 13—13 of Figure 10;

Figure 14 is an enlarged section taken along line 14—14 of Figure 11 with the bleeder strip, as in Figure 13, running along the side edges of the heating plate rather than the front and rear edges thereof;

Figure 15 is an enlarged sectional view showing the upper and lower plates closed on one another;

Figure 16 is a fragmentary elevation showing details of the clamps and actuating mechanism;

Figure 19 is a perspective view of a modified form of the apparatus which is designed for forming deep shapes in thermoplastic material.

Figure 17:
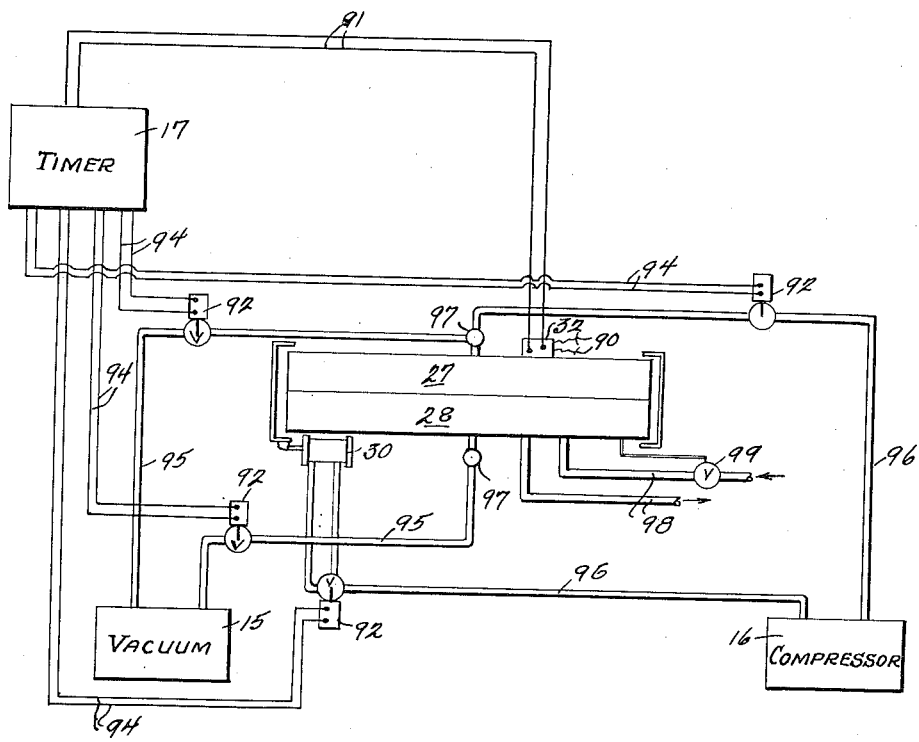
Figure 17 is a diagrammatic view of the apparatus of this invention.

In its briefest form the present invention embodies an apparatus for embossing and/or forming plastic material comprising a first plate which is heated and a second plate having a mold surface with means for closing the plates upon one another. Means are provided for cooling or heating the mold surface and for controlling the temperature of both the first and second plates. It is contemplated that means be provided adjacent the edges of said plates for forming a seal therebetween when the plates are closed. Air passages are appropriately cut into each of said plates for introducing and evacuating air from the inner surface of each plate. A vacuum source and an air pressure source are connected to said air passages and valve means are provided for controlling the transmission of air through said passages. The first plate is grooved on the inner surface thereof and provided with a bleeder strip along at least one extremity of said grooves so that air may be more completely evacuated from the surface of said plate when the plastic material is drawn into direct contact with the plate. Clamp means are included for holding the opposed plates in closed position when air under pressure is introduced therebetween. Means are further provided for timing the sequence of operation of the valves and the clamp means in accordance with the method of this invention.

Referring to the drawings, Figure 1 shows an embossing machine 10 of this invention having a frame with upright legs 11 and a bottom support 12. A hood 13 is provided for covering and protecting parts of the apparatus and a handle 14 enables the hood to be raised and lowered as desired. Carried by the support 12 are a vacuum source or pump 15, an air pressure source or compressor 16 and a control box 17 containing timing cams, relays and switches for controlling the sequence of operation of the apparatus in order to carry out the method of this invention.

In Figure 2 there is shown on frame 10 an upper support member 20 reinforced by bracket 21. Mounted above support member 20 is a bracket 22 and pivoted in the latter at 23 is a supporting beam 24. Depending from the rear of the beam 24 is a counterweight 25. Forward of the pivot point 23 of the beam 24 depend support bars 26. Secured to the lower extremities of the bars 26 is a first plate 27. Carried by the frame 10 beneath plate 27 is a second plate 28. Plate 27 is the heating plate and plate 28 is the mold plate. As shown the heating plate is in the upper position and the mold plate in the lower. However, it is to be understood that this relative positioning of the plates could be reversed. Adjacent each side of the plates are clamps 29 which are provided for holding the plates closed when air under pressure is introduced between the plates. A pneumatic air cylinder 30 is provided for moving the clamps horizontally in a direction toward and aaway from the sides of the plates through guide means 31. In Figure 3 the clamps are shown in open position so that the machine may be opened and the first plate raised. Mounted above the support beam 24 is a mercury switch 32 which starts the cycle of operation of the apparatus when the beam is lowered by the handle 14 to close the machine.

In Figure 4 there is shown the plate 28 as viewed from above. This plate has a mold 40 encased therein with a mold surface 41 having cavities producing a design. The mold may be made to form deep shapes, but, as shown in the present instance, it is designed for embossing fine surface details on thermoplastic material. Of course, this surface detail may be of considerable depth, the ability to accomplish a deep emboss in fine detail being one of the principal features of this invention.

Further details of the plate 28 are shown in Figures 5 through 8. Though the mold 40 may be heated if desired, means are shown for cooling same. In practice it has been found that although the operation of the apparatus is faster if the mold is kept at room temperature, results are frequently far better if the mold is allowed to become elevated to temperatures roughly half way between room temperature and the forming temperature of the material. Included are a series of connected water, or other coolant, tubes 42 traversing the plate 28 in parallel relationship. In order to set these tubes within the plate 28, holes 43 are drilled horizontally through the plate and tubes. The ends of the holes are plugged after the tubes are set therein. Connecting the adjacent parallel tubes are connecting bends 44 which depend below the plate. A water inlet is shown at 45 and a water outlet at 46. The same arrangement shown in the right hand side of Figure 5 is provided for the left hand side of the plate of Figure 5 as far as the water tubes are concerned. Figure 8 shows the water entrance at either side of the center of the plate.

As shown in Figures 5 and 7, horizontal air passages 50 are provided beneath the mold 40. Extending from these air passages 50 to the surface of the mold are vertical air passages 51, shown in Fig. 7, and as shown in Figure 8 a central air passage or bleeding point 52 extends entirely through the plate 28 and has an air pipe 53 set in the base thereof. Thus, through pipe 53, air may be evacuated from or introduced onto the mold surface 41 and the cavities therein through passages 52, 50 and 51 respectively.

A border strip 54 surrounds the mold 40 and is set on shoulders 55 of plate 28 by set screws 56. A ridge 57 runs along the upper inner edge of each strip 54 for a purpose to be pointed out later. Plastic material 58 is shown in position over the mold surface 41. As shown, the impressions of the mold have already been embossed therein. The depth of the embossing should be particularly noted, and it should also be appreciated that the plastic material actually flows or pours down into the impressions of the mold to its full depth, leaving a deep hollow on the upper side of the plastic rather than a flat surface as where mere mechanical pressing techniques are employed to emboss the material.

Returning to a discussion of the first plate 27 which is the heating plate, Figure 9 shows that the plate has an inner heating plate 27'. In Figures 10 and 14 it is shown that holes 60 are bored through the plate 27 to traverse the same in spaced parallel relationship. Electrical heating elements 61 are inserted into these holes for heating the plate 27 and plate 27' in turn. Electrical wires 62 connect these heating elements with a source of current, not shown. Though electric heating is preferred, steam, hot oil, or other means could be provided for heating the plate 27 and 27'. A thermostat and recording thermometer, not shown, is also connected to the plate 27 through wires 62.

As shown in Figure 14, the plate 27' is retained against plate 27 by screws 64. On the inner side of the plate 27 are air passages 65 leading to a central bleeding point 66 extending through the plate 27. At the forward and rear sides of the plate 27' are channels 67. As shown in Figures 9, 12 and 13 the exposed surface of the plate 27' is grooved or stippled with shallow parallel grooves 68. A bleeding strip 69 extends along the extreme ends of the grooves as shown in Figure 14 and is anchored between the plates 27 and 27' as shown at 69'. The bleeder strip 69 is spaced from the side edge of the plate 27' by a corrugated strip 70 to form an air passage 71 therebetween. Thus air may be drawn from the exposed surface of the plate 27' along the grooves 68 beneath the bleeder strip 69 through the passage 71, channel 67, air passage 65 and out through central bleeding point 66. As the air is so withdrawn the plastic material is drawn into contact with the surface of the plate 27' to enable direct conductive heating of the material. The grooves ensure that no air bubbles will be trapped between the material and the plate 27', and the bleeder strip prevents the material from closing the air passage 71.

Surrounding the plate 27' is a retaining strip 72 held in place on plate 27 by set screws 73. Secured between the strip 72 and the plate 27' is a gasket 74 which completely surrounds the plate 27'.

In Figure 15 the opposed plates 27 and 28 are shown closed upon one another with a sheet of thermoplastic material interposed therebetween. It will be noted that the ridge 57 pushes the thermoplastic material into the gasket 59 to form an air-tight seal entirely around the edges of the opposed plates 27' and 40 when they come opposite one another. As shown, the thermoplastic material 58 is loosely resting between the plates 27' and 40, the machine having just been closed prior to the starting of the operating cycle. Therefore, the thermoplastic material is resting on the mold surface 41 and is spaced very slightly from the exposed surface of the plate 27'.

Figure 16 shows some detail of the clamp means. The clamp 29 is moved horizontally over the edges of the plates 27 and 28 by a pneumatic air cylinder 30 to hold the plates in closed position. The cylinder 30 has a piston 80 and two air pipes 81 for operating same. A piston rod 82 is connected by a bracket 83 to the clamp 29. Guide 31 supports and controls the movement of clamp 29.

Figure 17 shows diagrammatically the wiring and piping for operating the apparatus of this invention to carry out the method thereof. Wires 90 lead from a source of electric power into the mercury switch 32 from which passes wiring 91 to the timing mechanism 17. Numerous solenoid valves 92 are wired to the timer 17 through circuits 94. From the vacuum source extend pipes 95 to the air passages of the upper and lower plates. Pipes 95 have solenoid valves 92 interposed therein. From the air compressor extend pipes 96, one to the air passages of the upper plate and the other into the pneumatic cylinders 30, only one being shown, with appropriate solenoid valves 92 interposed therein. Atmospheric pressure or exhaust valves 97 are placed in the lines leading to the air passages of the plates 27 and 28 respectively. In practice, the air passages of both the heating plate and mold plate may be connected to a manifold to which are connected pipes and operating valves. For the heating plate, a vacuum valve, an air valve, and an exhaust valve are all connected to the manifold. For the mold plate, a vacuum valve and an atmospheric valve are connected to the manifold. Piping 98 transmits coolant fluid through the lower plate 28, and a thermostatically controlled valve 99 is interposed in the line for controlling the temperature of the plate 28.

Figure 18:
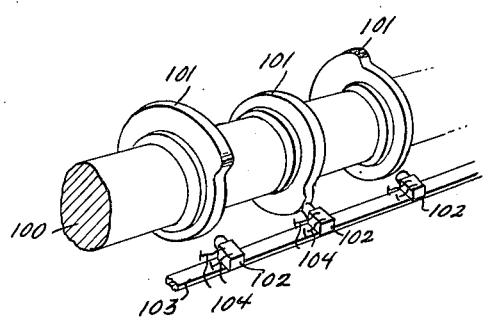
Figure 18 is a fragmentary perspective of a portion of the timing mechanism of this invention.

In Figure 18 is shown a portion of the timing mechanism for controlling the sequence of operation of this apparatus. A shaft 100 carries a series of cams 101 thereon which operate switches 102 carried on a bar 103. Wires 104 lead from the switches to each of the separate solenoid valves.

Though the apparatus of this invention has been described with particular reference to an embossing machine, it is understood that a forming machine is also considered as part of the invention. Figure 19 shows a perspective of the forming machine, and in general the machines are the same except that it is not necessary to provide the air passage means beneath the mold 40 because the air may be drawn straight through the central bleeding point 110 as the material is pulled down into the mold. Also since no high pressure is necessary, no clamps are provided. As far as valves are concerned, only a vacuum and atmospheric valve are required for the heating plate, and a vacuum valve and atmospheric valve on the mold plate. It should also be understood that it is possible to have the surface 41 of the mold 40 of Figure 19 provided with a design for embossing the thermoplastic material as it is being formed in deep shapes.

Now that the apparatus of this invention has been described, it is believed that a preferred sequence of operation of the valves is important for a full understanding of the invention. After the material is placed in the apparatus and the apparatus is closed to operate the mercury switch, the following sequence of operations takes place:

1. The solenoid valve in the vacuum line leading to the plate 27 is opened so as to draw the plastic material into direct contact with the plate 27'. All of the air is bled from the surface of this plate because of the grooves provided thereon.

2. After the required heating time, which depends upon the type and thickness of material to be embossed or formed, the solenoid valve in the vacuum line of plate 28 is opened.

3. The two plates 27 and 28 are now held together by atmospheric pressure on the outside, thus allowing a small clearance for the clamps to close upon the plates. These clamps are closed by operation of the pneumatic cylinders 30 through the solenoid valves in the air pressure line.

4. With the air now completely evacuated between the plates the valve in the vacuum line of plate 27, the heating plate, is closed, and a high pressure valve (or atmospheric pressure valve in instances where high pressure is not required) is opened; thus instantaneously forcing the material against the mold surface.

5. After the embossing (or forming) and cooling of the thermoplastic material under pressure has taken place, the high pressure line leading into plate 27 is closed, and the exhaust valve for plate 27 is opened which allows the high pressure air to escape.

6. The latter mentioned exhaust valve is then closed and the valve in the vaccum line on plate 27 is opened, thus forcing the plates together again and allowing a clearance for the clamps to be opened.

7. The valve in the vacuum line of the heating plate 27 is again closed, and the exhaust valve for plate 27 is again opened. This allows atmospheric air to enter between the heating plate and the material, thereby permitting the apparatus to be opened.

8. The valve in the vacuum line of the mold plate 28 is now closed and the exhaust valve of plate 28 is opened to complete the operation. The material is now removed from the apparatus having been completely embossed or formed.

As an example of the time required to carry out some of these various steps, it will be noted that step 1 as outlined above is preferably accomplished in approximately one second. Step 2 is accomplished in approximately 10 seconds with thin sheets of thermoplastic material. Step 3 is accomplished in about one second, step 4 in about 1½ seconds, step 5 in about two seconds, step 6 in about 1½ seconds and step 7 in about three seconds. The whole operation may be conveniently completed in about 15 to 20 seconds though even less time will produce good results.

While the invention has been described with reference to particular embodiments, it is contemplated that modifications thereof may be made without departing from the spirit of the invention. It is intended that the scope of the invention be limited only as defined in the appended claims, which are to be interpreted as broadly as the state of the art will permit.

I claim:

1. An apparatus for embossing plastic material comprising a conductive heating plate, a mold plate pivotally mounted with respect to said heating plate, said heating plate and said mold plate being substantially flat and adapted to close upon one another in closely spaced parallel relationship, a plurality of shallow closely spaced parallel grooves on the inner surface of said heating plate extending across the surface thereof, a bleeder strip extending along an edge of said heating plate and along the extreme ends of the grooves, and air passage means in communication with said grooves beneath said bleeder strip adapted for evacuating and introducing air along said grooves and out beneath said bleeder strip.

2. Apparatus as claimed in claim 1, a vacuum source connected to said air passage means, and control means for controlling introduction and evacuation of air from the surface of said heating plate.

3. Apparatus as claimed in claim 2, said bleeder strip being spaced from the edge of said heating plate by a corrugated strip to form an air passage therebetween, said grooves ensuring evacuation of air from between said heating plate and plastic material thereon, and said bleeder strip preventing material from closing said air passage.

4. Apparatus as claimed in claim 3, clamps slidably engageable with said plates for maintaining them in closed relationship and means operable to automatically engage and disengage said clamps.

References Cited in the file of this patent

UNITED STATES PATENTS

| | | |
|---|---|---|
| 1,387,616 | Roberts | Aug. 16, 1921 |
| 1,592,536 | O'Neill | July 13, 1926 |
| 1,737,874 | Busch | Dec. 3, 1929 |
| 1,870,255 | Krause et al. | Aug. 9, 1932 |
| 1,894,017 | Bostwick | Jan. 10, 1933 |
| 2,230,189 | Ferngren | Jan. 28, 1941 |
| 2,336,578 | Skoning | Dec. 14, 1943 |
| 2,364,029 | Ryan | Nov. 28, 1944 |
| 2,422,979 | Pecker | June 24, 1947 |
| 2,442,338 | Borkland | June 1, 1948 |
| 2,452,382 | Long | Oct. 26, 1948 |
| 2,478,165 | Collins | Aug. 2, 1949 |
| 2,486,760 | Pfeiffer | Nov. 1, 1949 |